(12) United States Patent
Bera

(10) Patent No.: US 6,963,865 B2
(45) Date of Patent: *Nov. 8, 2005

(54) METHOD SYSTEM AND PROGRAM PRODUCT FOR DATA SEARCHING

(75) Inventor: Rajendra Kumar Bera, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 462 days.

This patent is subject to a terminal disclaimer.

(21) Appl. No.: 09/826,710

(22) Filed: Apr. 5, 2001

(65) Prior Publication Data

US 2002/0147705 A1 Oct. 10, 2002

(51) Int. Cl.$^7$ .............................................. G06F 17/30
(52) U.S. Cl. ........................... 707/3; 707/10; 707/102; 707/104.1; 707/201; 709/213
(58) Field of Search ............................. 707/1, 2, 3, 4, 707/5, 6, 10, 102, 104.1, 201, 103, 202, 205, 100; 709/213, 102, 202, 218, 217, 313

(56) References Cited

U.S. PATENT DOCUMENTS 5,694,593 A * 12/1997 Baclawski ...................... 707/5
5,884,303 A * 3/1999 Brown .......................... 707/3
6,493,709 B1 * 12/2002 Aiken ........................... 707/4

OTHER PUBLICATIONS

U.S. Appl. No. 09/574,152, filed May 18, 2000, Rajendra Kumar Bera.
U.S. Appl. No. 09/574,152, filed May 18, 2000, Rajendra Kumar Bera.

* cited by examiner

Primary Examiner—Alford Kindred
Assistant Examiner—Fred Ehichioya
(74) Attorney, Agent, or Firm—Anthony V.S. England; T. Rao Coca; Manny Schecter

(57) ABSTRACT

A method and apparatus for searching data to locate a portion identified by a search query. The data may comprise text files in a database. The search query comprises two or more data fragments expected to be contained in the portion of data being sought and in any order. The method comprises receiving the data fragments and searching the data to locate matches between the data and the respective data fragments. Any overlapping matches are discriminated and replaced by an iterative search process until there is found a minimal portion of the data containing all of the data fragments without overlaps, the term minimal meaning a portion with only one complete set of the data fragments (though some but not all can be duplicated). The identified portion of text can be highlighted in a display of the data.

15 Claims, 2 Drawing Sheets

METHOD SYSTEM AND PROGRAM PRODUCT FOR DATA SEARCHING

BACKGROUND OF THE INVENTION

1. Field of the Invention

This invention relates to a method, system and program product for data searching in a computer environment, that is to say for acting upon a search query supplied to a computer by a user and for locating data in accordance with the query. More particularly, but not exclusively, the invention relates to locating text which may be present in a database of stored text files and which is in accordance with a user supplied search query.

The term "program product" here means a body of computer code stored by a machine readable storage medium such as a CD-ROM or one or more floppy discs, or made available for downloading from a remote computer site.

2. Related Art

In order to identify or locate particular documents or blocks of text in a data base of text files, it is known to provide a method and apparatus which can receive a user supplied search request comprising a particular text string and which will carry out an hierarchical search through an indexed database to find a matching string within the database. One such known method and apparatus is disclosed in U.S. Pat. No. 5,781,772 to Wilkinson, III et al. Also known are systems able to carry out Boolean searching in which documents stored in a database are located on the basis of a search query made up of two or more text strings linked by logical operators such as AND, OR and AND NOT. Special logical operators are also available sometimes, for example "near" where documents are located if two particular words appear next to each other or within a specified number of words from each other in the document.

The result of a search of a large database may well comprise many, perhaps a very large number of, 'hits', this being due to the searcher being unable to recollect exactly the item for which he is seeking and to the lack of some search capability enabling the search to be more refined. Also, whilst known systems are able to identify particular documents containing the text strings in a search query, it is still required to search each document found to identify where the text strings are located within that document and whether they add up to meaningful whole, e.g. whether they are contained in a text passage identifying the passage in a meaningful way.

In the specification of U.S. patent application Ser. No. JP919990273US1 entitled "Method and apparatus for data searching and computer readable medium for supplying program instructions" assigned to the same assignee as the present application and incorporated herein by reference, there is disclosed a text search method of which one embodiment is intended to seek a text portion comprising text fragments in a predetermined order. More generally, the method comprises receiving a sequence of two or more data fragments expected to be contained within a body of data (the data can be but is not necessarily text); searching the body of data to locate matches between the data and the respective data fragments; and identifying a portion of the body of data from the address of a match with the first data fragment in the sequence and the terminal address of a match with the last data fragment in the sequence.

One embodiment of the method disclosed in the above specification identifies a minimal text portion containing text fragments in a given order (by the term minimal portion there is meant a portion which contains only one complete sequence of the text fragments. Generally at least one of the fragments will appear only once but the portion may contain additional instances of one or some of the fragments). However, there may well be a need to search within a given text for a portion which contains two or more given text fragments but of which the order is not known. For example, it might be remembered vaguely that the text portion to be found is either:

1. The man was lurking in the dark alley. or
2. The alley was dark. The man was lurking there.

If a search request comprising the text fragments "man . . . lurking . . . dark" is passed to the previously proposed algorithm, the request will find the first text portion but not the second. On the other hand, if the search request consisted of the text fragments "dark . . . man . . . lurking", the second text portion would be found but not the first. This is because the previously proposed algorithm will look for a portion of text in which the text fragments appear in the same sequence as given in the search request.

One object of the invention is to make available a search algorithm which provides an additional functionality or an additional search query format for identifying documents and/or locating blocks of text in a database of text files.

Another object is to provide an apparatus and method for data searching able to better discriminate specific blocks of text identified by a search query.

In particular, it is an object to provide an algorithm for handling a search query comprising text fragments and which will find a text portion containing these fragments in an order different to that of the search query.

SUMMARY OF THE INVENTION

The invention comprises a computer method, system and program product for searching data to locate a portion of said data identified by a search query. It comprises, or comprises means or program portions for, receiving a search query including two or more data fragments expected to be contained within said data; searching the data to locate matches between the data and the respective data fragments; and identifying a minimal portion of said data that contains matches with all of the data fragments.

By the term "minimal portion" in this invention there is meant a portion of data containing only one complete set of the data fragments, i.e. the minimal portion may contain one or more fragments which appear more than once in the portion but not all of them can, at least one of the data fragments will appear only once. To explain this further, the search query might contain the data fragments A, B and C while the given data to be searched might include the fragments:

AB<u>BAACC</u>A

The minimal portion is the portion underlined, i.e. it includes all the data fragments A, B and C in the search query but at least two of them, the second and the last, appear only once. By identifying the minimal portion of data containing the text fragments there is more likely to be found a portion which associates the fragments in a meaningful way, for example, with the previous example of a query comprising the fragments "man", "lurking" and "dark" the minimal portion would be the given sentences or phrases containing those fragments. To identify the minimal portion of data, following reception of the search query and searching the data to locate matches between the data and the respective data fragments as described earlier in this summary, the invention can comprise identifying a portion of said data containing all of said data fragments and extending between:

an end location which is the terminal location of the first match with that one of said data fragments which is the last to appear in the data; and a start location which is the location of the match, next preceding said end location, with that one of the said data fragments which is the first to appear in the data.

In each case, the data may be displayed upon a display screen with highlighting of said identified portion of data or otherwise graphically indicating that portion.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
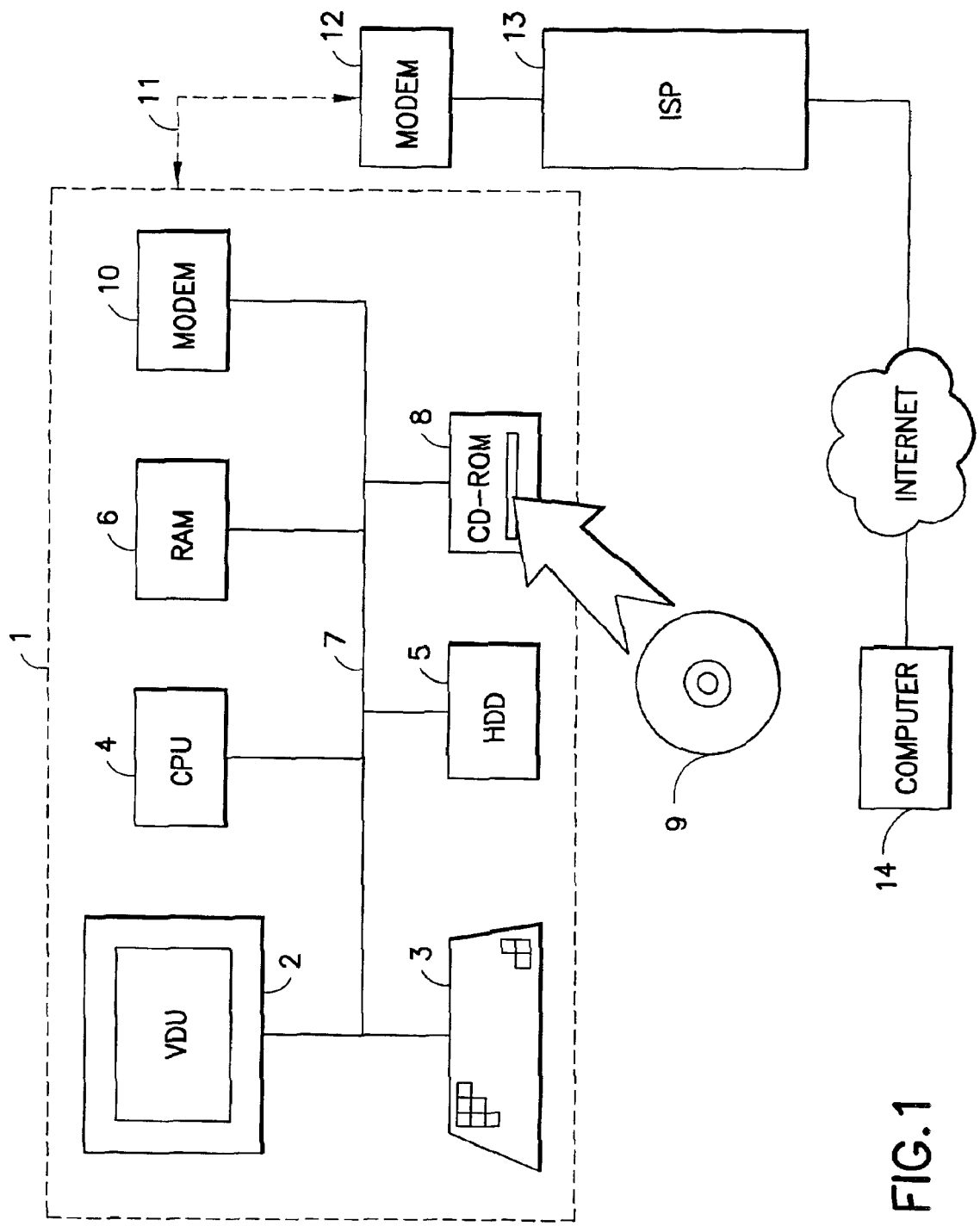
FIG. 1 is a block diagram of a computing environment.

The method described herein is intended to provide the following function. Namely, given a piece of text and a search request comprising two or more text fragments, where each text fragment is separated from the text by a separator symbol, the task is to find the first minimal portion of text, from the beginning of the text, that contains all the text fragments but without regard to the order in which the fragments appear in the search request. The search is considered successful if such a minimal portion of text is found. The algorithm may be intended for use in association with, or may be integrated into, software which also comprises the aforementioned previously proposed algorithm that finds text containing fragments in a specific order. In order to specify which particular algorithm is to be used, respective different separators can be used between the text fragments. For example, for the order sensitive search disclosed in the previous application, ellipses can be used (as disclosed in the previous application) and an alternative separator, for example ampersands, can be used for the non-order sensitive search.

The minimal portion of text will contain only one complete set of the search text fragments. However, one or more text fragments, but not all, from the search request may appear more than once in this portion. Two or more text fragments may not carry identical contents, nor can a text fragment be a substring of another text fragment in the search request. In the preferred embodiment of the invention to be described herein, the text fragments may partially overlap each other although this resolution of overlaps does add complexity to the algorithm.

If the search request contains only one text fragment, the minimal portion of text is simply the first occurrence of the text fragment in the given text.

A specific example of situations where the described algorithm may be useful is as follows:

Let

"insurgent&&&gent and &&&her cat &&& and other&&&green&&&sun"

be a search request. Here there are six text fragments—"insurgent", "gent and", "her cat", "and other", "green", and "sun". Note that the text fragments are separated by three consecutive ampersands (the separator symbol used here). Leading and trailing blanks in a text fragment, if present, are assumed to be part of the text fragment.

Now given the text

"Counterinsurgent and other categories of insurgent people sat around her cat. The gent and others with him stood a little far off from this group. With the setting sun, and the lake on one side of the house, and a green pasture on the other, it was a picturesque scene."

and the search request above, the task is to find the minimal portion of text, from the beginning of the text, which satisfies the search request.

In this example, a successful algorithm will find the minimal portion of text to be "<u>and other</u> categories of <u>insurgent</u> people sat around <u>her cat</u>. The <u>gent and</u> others with him stood a little far off from this group. With the setting <u>sun</u>, and the lake on one side of the house, and a <u>green</u>"

As well as for text searching, the search method, system and program according to the invention can be used in other situations, for example:

1. Searching for DNA sequences in a genome where it is desired to find DNA segments with unknown spacings in-between segments (to help, for example, in the hunt for genes and the proteins they encode which may have therauptic value. Note that 97% of the DNA's code is not genes, so a good search technique can be truly useful.).
2. Data mining—searching database records without an explicit reference to data fields. For example, a list of addresses, created as a text file collated from a database by an application program can be used to search for people regarding whom only fragmentary information is available. Here the structure of the database is immaterial, but the text file created by the application program is important.
3. Web search. More meaningful search of documents on the Web. When keyword searches on the Web produce a very long list of documents, search algorithms such as this can automate the further search of the listed documents for their relevance, specially, when used by domain experts searching documents in their domain of expertise.
4. Searching for code segments following certain patterns in very large codes.

FIG. 1 shows one embodiment of a computing environment in which the present invention may be implemented. This embodiment comprises a so-called stand alone computer 1, i.e. one which is not permanently linked to a network, including a display monitor 2, a keyboard 3, a microprocessor—based central processing unit 4, a hard-disc drive 5 and a random access memory 6 all coupled one to another by a connection bus 7. The keyboard 3 is operable for enabling the user to enter commands into the computer along with user data such as a search query. As well as keyboard 3, the computer may comprise a mouse or tracker ball (not shown) for entering user commands especially if the computer is controlled by an operating system with a graphical user interface.

To introduce program instructions into the computer 1, i.e. to load them into the memory 6 and/or store them onto the disc drive 5 so that the computer begins to operate, and/or is made able to operate when commanded, in accordance with the present invention the computer 1 comprises a CD-ROM drive 8 for receiving a CD-ROM 9.

The program instructions are stored on the CD-ROM 9 from which they are read by the drive 8. However, as will be well understood by those skilled in the art, the instructions as read by the drive 8 may not be usable directly from the CD-ROM 9 but rather may be loaded into the memory 6 and stored in the hard disc drive 5 and used by the computer 1 from there. Also, the instructions may need to be decompressed from the CD-ROM using appropriate decompression software on the CD-ROM or in the memory 6 and may, in any case, be received and stored by the computer 1 in a sequence different to that in which they are stored on the CD-ROM.

In addition to the CD-ROM drive 8, or instead of it, any other suitable input means could be provided, for example a floppy-disc drive or a tape drive or a wireless communication device, such as an infra-red receiver (none of these devices being shown).

Finally, the computer 1 also comprises a telephone modem 10 through which the computer is able temporarily to link up to the Internet via telephone line 11, a modem 12 located at the premises of an Internet service provider (ISP), and the ISP's computer 13. Also connected up to the Internet are many remote computers, such as the computer 14, from which information, software and other services are available for downloading to the computer 1.

Thus a program product according to this invention may comprise a storage medium such as a CD-ROM having stored a body of computer code for causing the computer 1 to carry out the inventive method. Alternatively, the program product may be implemented as a body of computer code made available for downloading to computer 1 from computer 14 by a supplier operating or using computer 14. The ISP's computer 13 can also be used in the same manner as computer 14.

The computer 1 does not have to be in a stand alone environment. Instead, it could form part of a network (not shown) along with other computers to which it is connected on a permanent basis. It could also be permanently coupled to or have a temporary link to a so-called intranet, i.e. a group of data holding sites similar to Internet sites or URL's and arranged in the same way as the Internet but accessible only to particular users, for example the employees of a particular company. Instead of modem 10, the computer 1 could have a digital hard-wired link to the ISP's computer 13 or the computer 1 could itself comprise a permanently connected Internet site (URL) whether or not acting as an ISP for other remote users. In other words, instead of the invention being usable only through the local keyboard 3, it may be available to remote users working through temporary or permanent links to computer 1 acting as ISP or simply as an Internet site.

The data to be searched could be data which has been entered into the computer via the keyboard 3, perhaps over a long period, and stored on the hard disc drive 5 or an another CD-ROM entered in the drive 8, assuming the drive and the other CD-ROM are capable of re-writing data to the CD-ROM, or on the aforementioned optional floppy disc or tape drive. The data to be searched could also be data which is stored on the CD-ROM 9 along with the program instructions, or it could be data which is available from say a file server (not shown) forming part of the aforementioned network, or from data holding sites within the Internet or the aforementioned intranet.

Figure 2:
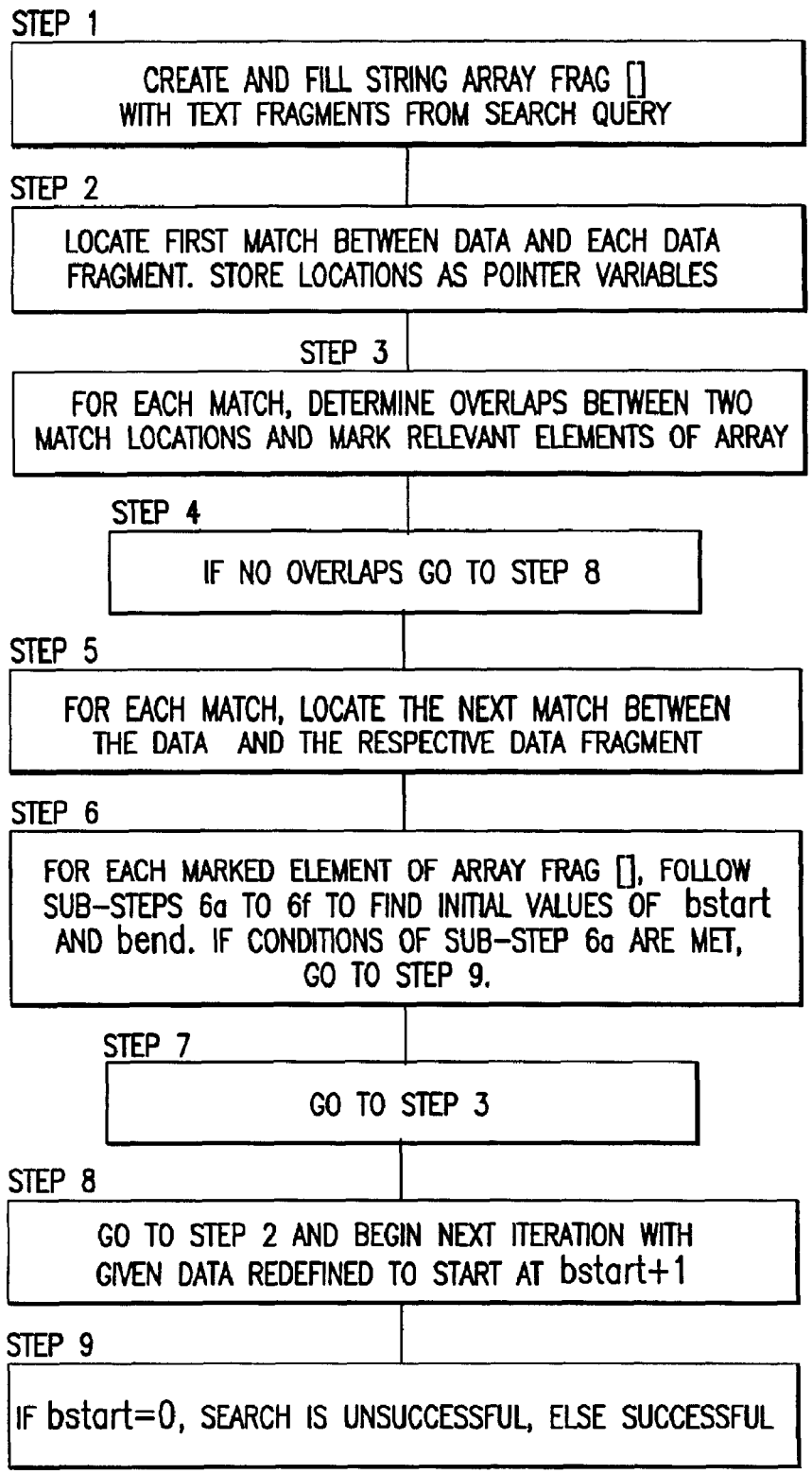
FIG. 2 is a flow chart showing a data search process.

The search method will be described below with reference to drawing FIG. 2 where the numbered steps correspond to the step numbers in the following description. First however it will be appreciated that the given text and/or text fragments in the search request can be formatted to a standard form before beginning the search. This is recommended although it is not referred to in FIG. 2. In this standard form, for example, multiple consecutive blanks can be replaced by a single blank; a blank before certain punctuation marks (stop, comma, semicolon, colon, hyphen, exclamation mark, question mark, etc), if found, is removed; a blank is placed after such punctuation marks, if not found; etc. The standard formatting helps, for example, if the text being searched has not been professionally edited.

The search method is intended to find the minimal portion of text, b, as defined above. The variables bstart and bend are used to point to the beginning and end respectively of the portion b.

The computer code executing the algorithm can incorporate features such as highlighting the block b as well as highlighting text fragments within them.

We now describe an algorithm which will accomplish the search task.

Let frag[0], frag[1], . . . , frag[n−1] be the text fragments in the search request. It is assumed that no two fragments are identical and that no fragment is a substring of another. For such a set of fragments, we shall say that frag[i] overlaps frag[j], i≠j, if the tail portion of frag[i] overlaps the head portion of frag[j]. Note that under the assumptions the overlap can only be partial and never complete. On this set of text fragments carry out the following operations, for i, j=0, . . . , n−1:

Step 1. Create a string array variable and call it frag[ ] and fill this array with the text fragments in the same sequence as they appear (for convenience, although any ordering will do) in the search request. Thus, for the search example cited above, we have n=6, and frag[0]="insurgent"

frag[1]="gent and"

frag[2]="her cat"

frag[3]="and other"

frag[4]="green"

frag[5]="sun"

Note that frag[0] overlaps frag[1], frag[1] overlaps frag[3] and frag[3] overlaps frag[2]. For each frag[i] create a corresponding pointer variable fptr[i] to store information about the location of a found instance of frag[i] within the text, and overlap information, if any, for this instance. Also, create a corresponding pointer variable nptr[i] to store information about the location of the next found instance of frag[i] in the text. Put bstart=0. In the following, steps 2 to 8 are iterative.

Step 2. For each frag[i] find its first instance from the beginning of the given text and, if found, save the pointer to the instance of frag[i] in fptr[i] in the form of a character string. We shall refer to this saved pointer as<fptr[i]>. If an instance of all the frag[i] has been found, then go to the next step, otherwise go to step 9.

Step 3. For each i, determine if the address stored in some fptr[j] (that is, <fptr[j]>)j≠i, lies between <fptr[i]> and <fptr[i]>+strlen (frag[i]), that is, <fptr[j]>><fptr[i]> and <fptr[j]><<fptr[i]>+strlen (frag[i]). If for aj the answer is yes, then append to the address stored in fptr[i] the string ".<fptr[j]>, j" so that fptr[i] now contains the modified string "<fptr[i]>. <fptr[j]>, j". Note that the dot is used here to indicate that frag[j] begins before frag[i] ends for this instance of frag[i], and ", j" is used to save the index j for later reference. Note also, that if frag[j] in turn overlaps, say, another fragment frag[k], then this fact will emerge when fptr[j] is examined. Thus multiple overlaps of such nature will be chained together and can be traced. And finally, note that at least one fptr[i] will not have a dotted extension, for example, the fptr[i] with the highest address will not have a dotted extension.

Step 4. If none of the fptr[i] has been dotted in step 3, then conclude the current iteration and calculate bstart=min (fptr[3], and bend=lptr+strlen(lptr)−1, where lptr=max (fptr[ ]) and go to step 8. Otherwise proceed to the next step.

Step 5. For each i search for the next instance of frag[i] and if found save its pointer in nptr[i]. If not found then save a null pointer in nptr[i].

Step 6. For an fptr[i], which has a dotted extension, say, fptr[j], (that is, it has the form <fptr[i]>. <fptr[j]>,j) look at fptr[j], nptr[i] and nptr[j], and go through substeps (a) to (f) below, as applicable. Repeat this step till no fptr[i] is left with a dotted extension following which go to step 7.

(a) If fptr[j] does not have a dotted extension, and if both nptr[i] and nptr[j] contain null pointers then go to step 9.

(b) If fptr[j] does not have a dotted extension, and if nptr[i] contains a null pointer and nptr[j] does not, then delete the dotted extension (that is, remove the substring ".<frag[j]>,j") from the contents of fptr[i] and replace the contents of fptr[j] with the contents of nptr[j].

(c) If fptr[j] does not have a dotted extension, and if nptr[i] does not have a null pointer and nptr[j] does, then replace the contents of fptr[i] with the contents of nptr[i].

(d) If fptr[j] does not have a dotted extension, and if <nptr[i]><<nptr[j]>, then, in fptr[ ] search for a <fptr[k]>. <fptr[i]>,i", (there will be only one such, if it exists), and if found, replace "<fptr[k]>. <fptr[i]>,i" with "<fptr[k]>". Replace "<fptr[i]>. <fptr[j]>,j" with "<nptr[i]>".

(e) If fptr[j] does not have a dotted extension, and if <nptr[i]>><nptr[j]>then delete the dotted extension (that is, remove the substring ".<frag[j]>,j") from the contents of fptr[i] and replace the contents of fptr[j] with the contents of nptr[j].

(f) If fptr[j] has a dotted extension, then go down the chain till an fptr[l] without a dotted extension is found (there will be one such). Let the upward link to fptr[l] be fptr[k] (that is, the contents of fptr[k] are <fptr[k]>.<fptr[l]>,1). Treat fptr[k] as fptr[i] and fptr[l] as fptr[j], and start again from step 6(a) above.

Step 7. Go to step 3.

Step 8. Go to step 2 and begin the next iteration with the text now redefined as the character sequence beginning with the pointer bstart+1 and ending at the pointer bend. Note that at this step we have a text block which contains at least one instance of all the text fragments in the search request. The iterations undertake the task of compressing the size of this block by seeking a higher value for bstart without violating the conditions of the search request.

Step 9. Mark the search as unsuccessful if bstart=0, else successful. If successful, the found text b begins at bstart and ends at bend. Note that b is the given text of the previous iteration.

To give further insight into the described method, it will be applied to the example (mentioned earlier) in which the given text is as follows:

"Counterinsurgent and other categories of insurgent people sat around her cat. The gent and others with him stood a little far off from this group. With the setting sun, and the lake on one side of the house, and a green pasture on the other, it was a picturesque scene."

The given text is (assumed to begin at memory address 1000 when stored in memory) and the search request is "insurgent&&&gent and &&&her cat&&& and other&&&green&&&sun"

First Iteration

Step 1. We have n=6, and the text fragments frag[0]="insurgent"

frag[1]="gent and"

frag[2]="her cat"

frag[3]="and other"

frag[4]="green"

frag[5]="sun"

Note that frag[0] overlaps frag[1], frag[1] overlaps frag[3], and frag[3] overlaps frag[2]. Create the arrays fptr[i] and nptr[i]. Put bstart=0. Begin the first iteration.

Step 2. Pointers to the first instance of text fragments are saved in their respective fptr[ ]. These are:

fptr[0]="1007"

fptr[1]="1012"

fptr[2]="1023"

fptr[3]="1016"

fptr[4]="1214"

fptr[5]="1164"

where it is assumed that the given text begins at the address 1000. Since all the fptr[ ] are populated, we go to the next step.

Step 3. After searching for overlaps, the contents of fptr[ ] are modified as follows:

fptr[0]="1007.1012,1"

fptr[1]="1012.1016,3"

fptr[2]="1023 fptr[3]="1016.1023,2"

fptr[4]="1214"

fptr[5]="1164"

Step 4. Since there are dotted entries in some of the fptr[ ]s, we proceed to the next step.

Step 5. The entries in the nptr[ ]s are as follows:

nptr[0]="1041"

nptr[1]="1082"

nptr[2]="1069"

nptr[3]="1086"

nptr[4]=""

nptr[5]=""

Step 6. Upon examination of fptr[0], we find that the condition set out in sub-step 6(f) applies. Hence, from fptr[0] we go to fptr[1] then to fptr[3], and finally to fptr[2]. The upward link to fptr[2]="1023" is fptr[3]="1016.1023,2". With fptr[i]=fptr[3] and fptr[j]=fptr[2] we proceed to sub-step 6(a). Sub-steps 6(a) to 6(d) do not apply. Sub-step 6(e) applies because fptr[2] does not have a dotted extension and <nptr[3]> is greater than <nptr[2]>. Therefore we delete the dotted extension from the contents of fptr[3] and are left with "1016", and replace the contents of fptr[2] with those of nptr[2]. The updated contents of fptr[ ] are now fptr[0]="1007.1012,1"

fptr[1]="1012.1016,3"

fptr[2]="1069"

fptr[3]="1016"

fptr[4]="1214"

fptr[5]="1164"

Sub-step 6(f) does not apply. Since there are some fptr[ ] which still have a dotted extension, step 6 is repeated.

Step 6 (repeat)Upon examination of fptr[0], it will be found that sub-step 6(f) applies. From fptr[0] we go to fptr[1] then finally to fptr[3]. The upward link to fptr[3]="1016" is fptr[1]="1012.1016,3". With fptr[i]=fptr[1] and fptr[j]=fptr[3] we proceed to sub-step 6(a). Sub-steps 6(a) to 6(c) do not apply. Sub-step 6(d) applies because fptr[3] does not have a dotted extension and <nptr[1]> is less than <nptr[3]>. Since there is an fptr[k] (k=0) for which fptr[1] is its dotted extension, the dotted extension is deleted from the contents of fptr[0] and the contents of fptr[1] are replaced with those of nptr[1]. The updated contents of fptr[ ] are now fptr[0]="1007"
fptr[1]="1082"
fptr[2]="1069"
fptr[3]="1016"
fptr[4]="1214"
fptr[5]="1164"

The conditions set out in sub-steps 6(e) and 6(f) do not apply. Since fptr[ ] does not have any element with a dotted extension, step 7 is proceeded to and this directs the method to step 3 for another search iteration.

Step 3. Since there are no overlaps in fptr[ ], the method proceeds to step 4 which calculates bstart=1007, and bend=1214+strlen (frag[4])−1=1214+5−1=1218. The portion of text bracketed by bstart and bend is "insurgent and other categories of insurgent people sat around her cat.

The gent and others with him stood a little far off from this group. With the setting sun, and the lake on one side of the house, and a green"

The method now proceeds via step 8 to step 2 with the given text now bracketed by bstart+1 and bend, that is, the given text is now "nsurgent and other categories of insurgent people sat around her cat.

The gent and others with him stood a little far off from this group. With the setting sun, and the lake on one side of the house, and a green"

Second Iteration

Step 2. This produces the following fptr[0]="1041"
fptr[1]="1012"
fptr[2]="1023"
fptr[3]="1016"
fptr[4]="1214"
fptr[5]="1164"

Step 3.The search for overlaps modifies them to fptr[0]="1041"
fptr[1]="1012.1016,3"
fptr[2]="1023"
fptr[3]="1016.1023,2"
fptr[4]="1214"
fptr[5]="1164"

Step 4. Since there are dotted entries in some of the fptr[ ]s, we proceed to the next step.

Step 5. The entries in the nptr[ ]s are as follows:

nptr[0]=""
nptr[1]="1082"
nptr[2]="1069"
nptr[3]="1086"
nptr[4]=""
nptr[5]=""

Step 6. Upon examination of fptr[1], we find that 6(f) applies. From fptr[1] we go to fptr[3], and finally to fptr[2]. The upward link to fptr[2]="1023" is fptr[3]= "1016.1023,2". With fptr[i]=fptr[3] and fptr[j ]=fptr[2] we proceed to step 6(a). Steps 6(a) to 6(d) do not apply. Step 6(e) applies because fptr[2] does not have a dotted extension and <nptr[3]> is greater than <nptr[2]>. Therefore we delete the dotted extension from the contents of fptr[3] and are left with "1016", and replace the contents of fptr[2] with those of nptr[2]. The updated contents of fptr[ ] are now fptr[0]="1041"
fptr[1]="1012.1016,3"
fptr[2]="1069"
fptr[3]="1016"
fptr[4]="1214"
fptr[5]="1164"

We find that step 6(f) does not apply. Since there are some fptr[ ] which still have a dotted extension, we repeat step 6.

Step 6 (repeat)Upon examination of fptr[1], we find that step 6(d) applies because fptr[3] does not have a dotted extension and <nptr[1]> is less than <nptr[3]>. Since there is no fptr[k] for which fptr[1] is its dotted extension, we replace the contents of fptr[1] with those of nptr[1]. The updated contents of fptr[ ] are now fptr[0]="1041"
fptr[1]="1082"
fptr[2]="1069"
fptr[3]="1016"
fptr[4]="1214"
fptr[5]="1164"

We find that steps 6(e) and 6(f) do not apply. Since fptr[ ] does not have any element with a dotted extension, we go to step 7 which directs us to step 3 for another search iteration.

Step 3. No overlaps were found in fptr[ ] We go to step 4.

Step 4. We calculate bstart=1016, and bend=1214+strlen (frag[4])−1=1214+5−1=1218. The portion of text bracketed by bstart and bend is "and other categories of insurgent people sat around her cat. The gent and others with him stood a little far off from this group. With the setting sun, and the lake on one side of the house, and a green"

We now go to step 8 which directs us to step 2 with the given text now bracketed by bstart+1 and bend, that is, the given text is now "and other categories of insurgent people sat around her cat. The gent and others with him stood a little far off from this group. With the setting sun, and the lake on one side of the house, and a green"

Third Iteration

Step 2. This produces the following fptr[0]="1041"
fptr[1]="1082"
fptr[2]="1023"
fptr[3]="1086"
fptr[4]="1214"
fptr[5]="1164"

Step 3. The search for overlaps modifies them to fptr[0]="1041"
fptr[1]="1082.1086,3"
fptr[2]="1023"
fptr[3]="1086"
fptr[4]="1214"
fptr[5]="1164"

Step 4. Since there are dotted entries in some of the fptr[ ]s, we proceed to the next step.

Step 5. The entries in the nptr[ ]s are as follows:

nptr[0]=""
nptr[1]=""

nptr[2]="1069"
nptr[3]=""
nptr[4]=""
nptr[5]=""

Step 6. Upon examination of fptr[1], we find that 6(a) applies. Therefore go to step 9.

Step 9. Since bstart ≠0, the search has been successful. That is, the text of the previous iteration is the desired b.

Whilst a particular preferred embodiment of the invention has been shown and described herein it will be understood that persons of skill in the art may modify the embodiment and that such modifications and developments are within the purview of the invention as described or claimed.

What is claimed is:

1. In a computer environment, a method for searching data to locate a portion of said data identified by a search query, the method comprising:

receiving a search query including two or more fragments expected to be contained within said data; and searching the data for a minimal portion thereof, wherein to qualify as a minimal portion a portion of the data must contain: i) all the search query fragments and ii) no more than one occurrence of at least one of the search query fragments, and a portion of the data may qualify as a minimal portion even if: i) the data portion contains more than one occurrence of other ones of the search query fragments and ii) a sequence of the search query fragments in the data portion is different than a sequence of the fragments in the search query, and wherein if a data portion qualifies as a minimal portion the method includes the step of identifying the data portion as a minimal portion.

2. A method according to claim 1, wherein one of said search query fragments is a first fragment occurring in the searched data and one of said search query fragments is a last fragment occurring in the searched data and the identifying includes identifying a portion of said data containing all of said search query fragments and extending between:

an end location, wherein the end location is a location of a first match with that one of said last search query fragments; and a start location, wherein the start location is a location of a match, next preceding said end location, with that one of said first search query fragments.

3. A method according to claim 1, wherein the step of searching includes the steps of:

searching the data to locate matches between the data and the respective search query fragments;

(iv) recording memory addresses of said matches;

(v) for each match, identifying any partial overlap with any other match;

(vi) for any such partial overlap, searching said data to seek a new match which does not overlap any other match; and (vii) identifying a portion of said data from a location of a first non-overlapping match to a location of a last non-overlapping match.

4. A method according to claim 1, comprising the steps of:

(i) storing the search query fragments in computer memory as respective string variables having string lengths;

(ii) searching the data to locate first matches between the data and the respective search query fragments and, storing the locations of the respective first matches as respective pointer variables;

(iii) by reference to the pointer variables and the string lengths of the search query fragments determining any partial overlaps between said matches;

(iv) for any such partial overlap, searching the data to locate a next match with one of the search query fragments and storing a location of that next match in a respective further pointer variable;

(v) by reference to said pointer variables determining any remaining partial overlaps between said matches and repeating step (iv) until there is identified a portion of said data containing all of said search query fragments without any overlaps therebetween.

5. A method according to claim 1, wherein the step of identifying includes displaying said data upon a display screen and highlighting said identified portion of data.

6. A system for searching data to locate a portion of said data identified by a search query, the apparatus comprising:

input means for receiving a search query including two or more fragments;

data supply means for supplying data to be searched;

control means connected to said input means and said data supply means and operable for searching data made available by the data supply means for a minimal portion thereof, wherein to qualify as a minimal portion a portion of the data must contain: i) all the search query fragments and ii) no more than one occurrence of at least one of the search query fragments, and a portion of the data may qualify as a minimal portion even if: i) the data portion contains more than one occurrence of other ones of the search query fragments and ii) a sequence of the fragments in the data portion is different than sequence of the fragments in the search query; and minimal portion identifying means for identifying a data portion as such a minimal portion if the data portion qualifies as such a minimal portion.

7. A system according to claim 6, wherein one of said search query fragments is a first fragment occurring in the searched data and one of said search query fragments is a last fragment occurring in the searched data and the identifying includes identifying a portion of said data containing all of said search query fragments and extending between:

an end location, wherein the end location is a location of a first match with that one of said last search query fragments; and a start location, wherein the start location is a location of a match, next preceding said end location, with that one of said first search query fragments.

8. A system according to claim 6, wherein the control means includes:

means for searching the data to locate matches between the data and the respective search query fragments;

means for recording memory addresses of said matches;

means for identifying, for each match, any partial overlap with any other match;

means for searching for any such partial overlap, said data to seek a new match which does not overlap any other match; and means for identifying a portion of said data from a location of a first non-overlapping match to a location of a last non-overlapping match.

9. A system according to claim 6, wherein the control means includes:

the data supply means includes means for storing the search query fragments in computer memory as respective string variables having string lengths;

means for searching the data to locate first matches between the data and the respective search query fragments and establishing the locations of the respective first matches as respective pointer variables;

means for determining any partial overlaps between said matches by reference to the pointer variables and the string lengths of the search query fragments; and partial overlap searching means for i) searching the data for any such partial overlap in order to locate a next match with one of the search query fragments and establishing a location of that next match in a respective further pointer variable and ii) determining any remaining partial overlaps between said matches by reference to said pointer variables, and repeating i) and ii) until there is identified a portion of said data containing all of said data fragments without any overlaps therebetween.

10. A system according to claim 6, wherein the minimal portion identifying means includes means for displaying said data upon a display screen and highlighting said identified portion of data.

11. A computer program product comprising a body of computer code for rendering a computer operable for searching data to locate a portion of the data identified by a user supplied search query, the product comprising:

computer code for enabling the computer to receive a search query including two or more fragments;

computer code for searching the data for a minimal portion thereof, wherein to qualify as a minimal portion a portion of the data must contain: i) all the search query fragments and ii) no more than one occurrence of at least one of the search query fragments, and a portion of the data may qualify as a minimal portion even if: i) the data portion contains more than one occurence of other ones of the search query fragments and ii) a sequence of the fragments in the data portion is different than a sequence of the fragments in the search query; and minimal portion identifying computer code for identifying a data portion as such a minimal portion if the data portion qualifies as such a minimal portion.

12. A computer program product according to claim 11, wherein one of said search query fragments is a first fragment occurring in the searched data and one of said search query fragments is a last fragment occurring in the searched data and the minimal portion identifying computer code includes computer code for identifying a portion of said data containing all of said search query fragments and extending between:

an end location, wherein the end location is a location of a first match with that one of said last search query fragments; and a start location, wherein the start location is a location of a match, next preceding said end location, with that one of said first search query fragments.

13. A computer program product according to claim 11, wherein the computer code for searching the data includes:

computer code for searching the data to locate matches between the data and the respective search query data fragments;

computer code for recording memory addresses of said matches;

computer code for identifying, for each match, any partial overlap with any other match;

computer code for searching said data, for any such partial overlap, to seek a new match which does not overlap any other match; and computer code for identifying a portion of said data from a location of a first non-overlapping match to a location of a last non-overlapping match.

14. A computer program product according to claim 11, comprising:

computer code for storing the search query data fragments in computer memory as respective string variables having string lengths;

computer code for searching the data to locate first matches between the data and the respective data fragments and establishing the locations of the respective first matches as respective pointer variables;

computer code for determining any partial overlaps between said matches by reference to the pointer variables and the string lengths of the data fragments;

partial overlap searching computer code for i) searching the data for any such partial overlap in order to locate a next match with one of the search query fragments and establishing a location of that next match in a respective further pointer variable and ii) determining any remaining partial overlaps between said matches by reference to said pointer variables, and repeating i) and ii) until there is identified a portion of said data containing all of said data fragments without any overlaps therebetween.

15. A computer program product according to claim 11, wherein the minimal portion identifying computer code includes computer code for displaying said data upon a display screen and highlighting said identified portion of data.

* * * * *